US006295404B1

(12) United States Patent
Ichigi et al.

(10) Patent No.: US 6,295,404 B1
(45) Date of Patent: Sep. 25, 2001

(54) OPTICAL FIBER ARRAY

(75) Inventors: Takenori Ichigi, Konan; Jungo Kondo, Nishikamo-gun; Yoshizumi Nakasuji, Nagoya; Eiji Kitakami, Kasugai, all of (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/440,949

(22) Filed: Nov. 16, 1999

(30) Foreign Application Priority Data

Nov. 19, 1998 (JP) .................................. 10-329725

(51) Int. Cl.$^7$ ...................................... G02B 6/00
(52) U.S. Cl. ................... 385/137; 65/80; 65/83
(58) Field of Search ................... 385/137, 60, 65, 385/75, 78, 80, 83, 95, 54, 97–99, 136

(56) References Cited

U.S. PATENT DOCUMENTS 5,037,179 * 8/1991 Bortolin et al. ..................... 385/54
6,160,947 * 12/2000 Osugi et al. ........................ 385/137
6,195,495 * 2/2001 Ota et al. ............................ 385/137

* cited by examiner

Primary Examiner—Phan T. H. Palmer
(74) Attorney, Agent, or Firm—Burr & Brown

(57) ABSTRACT

An optical fiber array includes a V-groove substrate for housing an uncovered glass fiber section formed at an end portion of an optical fiber contained therein. A lower covered section housing portion houses a covered section of the optical fiber and is formed to be deeper than the V-groove forming portion. An optical fiber is disposed so that the uncovered glass fiber section is housed in the V groove and the covered section is housed in the lower covered section housing portion. A lid substrate is composed of a glass fiber protective portion covering an upper surface of the uncovered glass fiber section and an upper covered section housing portion houses a covered section of the optical fiber. The upper covered section housing portion is formed to be deeper than the glass fiber protective portion and is disposed on the V-groove substrate. A resin is filled in the gaps among the V-groove substrate, the optical fiber, and the lid substrate and cured to give a unitary optical fiber array. The glass fiber protective portion has a fiber contact portion to bring the fiber contact portion into direct contact with the glass fiber section, and a non-contact portion which is not brought into direct contact with the glass fiber section of the optical fiber.

6 Claims, 6 Drawing Sheets

OPTICAL FIBER ARRAY

BACKGROUND OF THE INVENTION AND RELATED ART STATEMENT

The present invention relates to an optical fiber array formed by fixing a glass fiber section at the end of an optical fiber to a substrate.

Generally, an optical fiber array has a V-groove substrate 25 having a V-shaped groove 26 and a lid substrate 24 to be unified with the V-groove substrate 25 as shown in FIG. 7, and has a structure in which an uncovered glass fiber section 22 formed at the end of the optical fiber 21 is disposed on the V-shaped groove 26 of the V-groove substrate 25, the glass fiber section 22 is pressed against the V-shaped groove 26 from the upper surface of the V-groove substrate 25 by the lid substrate 24 to fix the glass fiber section 22.

The V-groove substrate 25 has a V-groove forming portion 29 having the V-shaped groove 26 for housing the uncovered glass fiber section 22 formed at the end of the optical fiber 21 and a lower covered section housing portion 27 for housing a covered portion 23 of the optical fiber 21, the lower covered section housing portion 27 being formed to be deeper than the V-groove forming portion 29. The lid substrate 24 has a glass fiber protective portion 30 covering an upper surface of the uncovered glass fiber section 22 of the optical fiber housed in the V-groove forming portion 29 and the V groove 26, and an upper covered section housing portion 28 for housing a covered section 23 of the optical fiber therein, the upper covered section housing portion 28 being formed to be deeper than the glass fiber protective portion 30.

For the V-groove substrate 25 and the lid substrate 24, materials, such as glass and silicon, having high hardness and being hardly deformed are employed to ensure a positioning precision of the optical fiber 21. The V-groove substrate 25, the optical fiber 21, and the lid substrate 24 are combined, and a resin (not depicted) is filled in the gaps among them and cured to unitarily fasten them with one another.

By the way, as shown in FIG. 8, a conventional optical fiber array has a structure in which a starting point $P_2$ of the upper counter-sunk proceeding from the glass fiber protective portion 30 to the upper covered section housing portion 28 is present above in an almost perpendicular direction (direction of a thickness of the substrates) of a starting point $P_1$ of the lower counter-sunk proceeding from the V-groove forming portion 29 to the lower covered section housing portion 27. In an optical fiber array having such a structure, a stress due to thermal expansion or thermal shrinkage of resin or a tensile stress applied to the optical fiber from the outside is prone to concentrate in a portion between the starting point $P_1$ of the lower counter-sunk and the starting point $P_2$ of the upper counter-sunk.

Further, upon producing an optical fiber array, the core glass fiber section 22 is prone to be damaged by an edge portion of the starting point $P_2$ of the upper counter-sunk when the glass fiber section 22 is pressed against the V groove 26 by the lid substrate 24. Since the damaged portion corresponds to the portion where the stress concentrates, it is apprehended that a crack is extended from the damaged portion by tensility of the fiber or a heat cycle and that the fiber is easily fractured. Further, since a fracture strength is seriously influenced by the size of the damage, products have variance in fracture strength and it is difficult to stabilize the quality of the products.

SUMMARY OF THE INVENTION

The present invention has been made in view of such conventional circumstances and aims to provide an optical fiber array having a structure in which an optical fiber is not easily broken since a stress is not concentrated in the damaged portion even if the optical fiber is damaged when an optical fiber array is produced.

According to the present invention, there is provided an optical fiber array comprising:

a V-groove substrate having: a V-groove forming portion having a V groove for housing an uncovered glass fiber section formed at an end portion of an optical fiber therein, and a lower covered section housing portion for housing a covered section of the optical fiber therein, the lower covered section housing portion being formed to be deeper than said V-groove forming portion, an optical fiber disposed so that the uncovered glass fiber section is housed in the V groove and the covered section is housed in the lower covered section housing portion, a lid substrate having: a glass fiber protective portion covering an upper surface of the uncovered glass fiber section of the optical fiber housed in the V-groove forming portion and the V groove, and an upper covered section housing portion for housing a covered section of the optical fiber therein, the upper covered section housing portion being formed to be deeper than said glass fiber protective portion, and disposed on the V-groove substrate, and a resin filled in gaps among the V-groove substrate, the optical fiber, and the lid substrate and cured to give a unitary optical fiber array, wherein the glass fiber protective portion has: a fiber contact portion formed at the end portion of the glass fiber protective portion so as to bring the fiber contact portion into direct contact with the glass fiber section of the optical fiber, and for the rest a fiber non-contact portion which is not brought into direct contact with the glass fiber section of the optical fiber.

BRIEF DESCRIPTION OF THE DRAWINGS

FIG. 3(a) shows a fixed condition of a glass fiber section in a I—I section of FIG. 2.

DETAILED DESCRIPTION OF THE INVENTION

Figure 1:
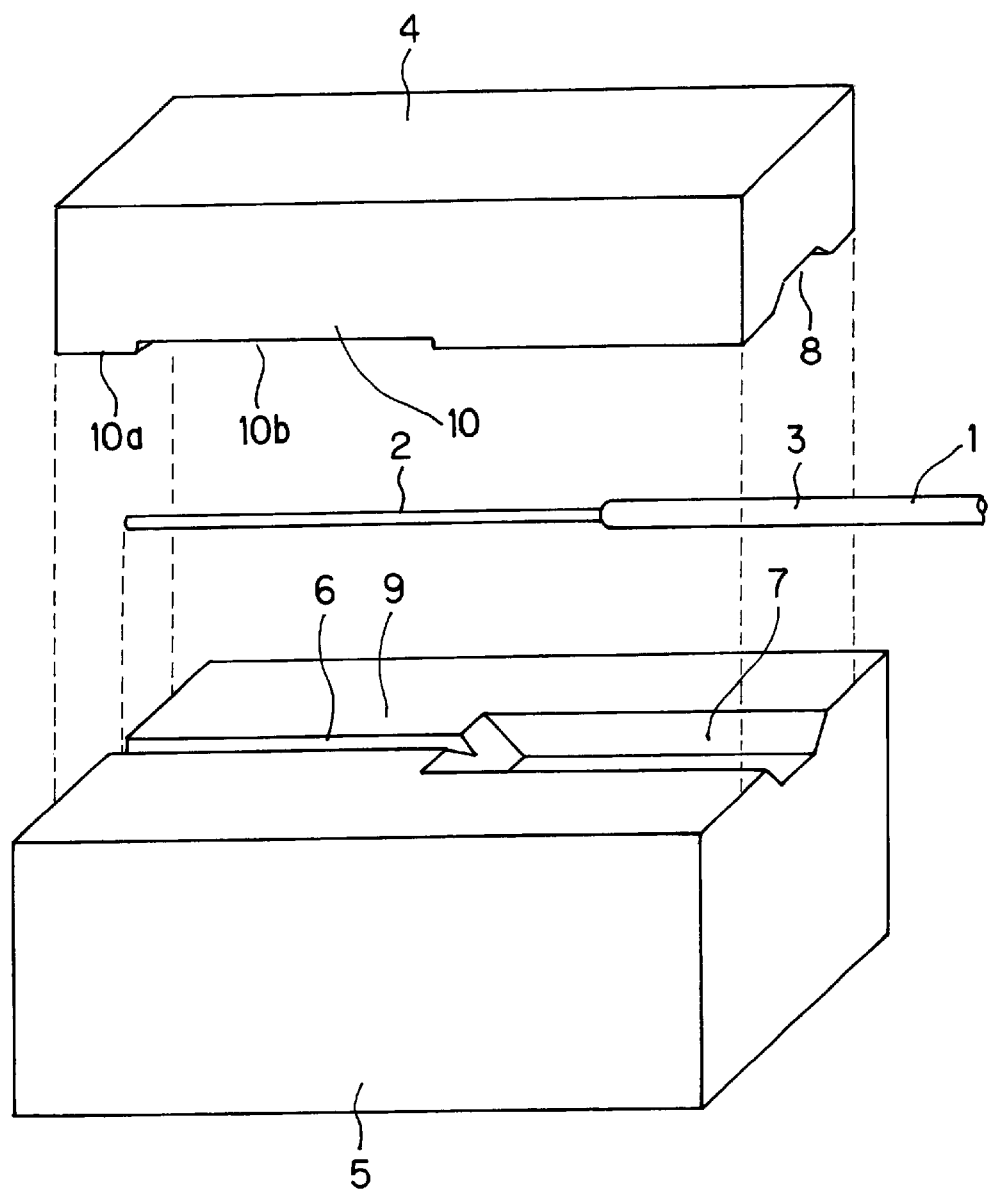
FIG. 1 is a decomposed perspective view showing an embodiment of an optical fiber array of the present invention.
Figure 2:
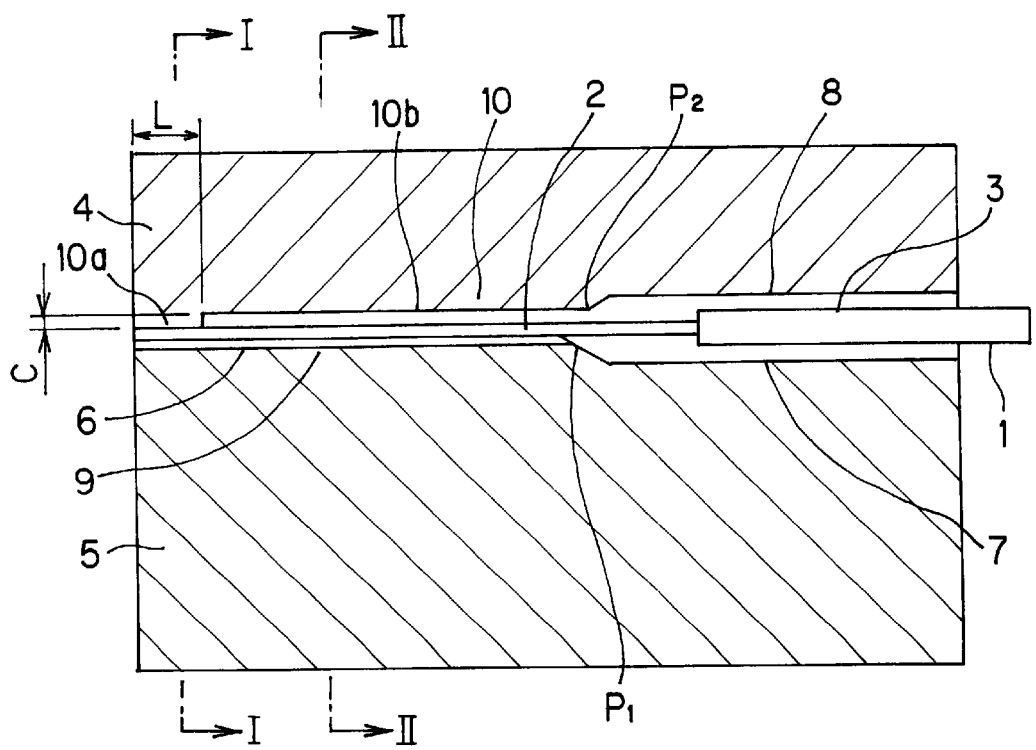
FIG. 2 shows a cross-sectional view showing an embodiment of an optical fiber array of the present invention.
Figure 3A:
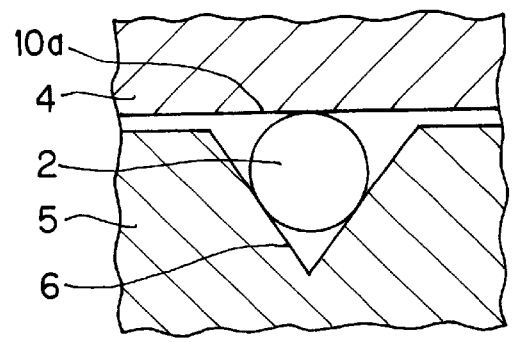
FIGS. 3(a)(b) are partial cross-sectional views showing fixed conditions of a glass fiber section of an optical fiber.
Figure 3B:
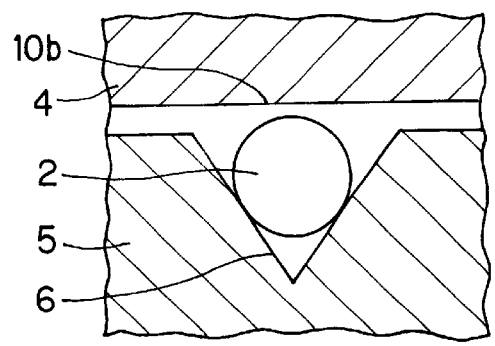
FIG. 3(b) shows a fixed condition of a glass fiber section in a II—II section of FIG. 2.

An embodiment of an optical fiber array of the present invention is described with reference to the drawings. FIG. 1 is a decomposed perspective view showing an embodiment of an optical fiber array of the present invention, and FIG. 2 is a cross-sectional view. FIGS. 3 are partial cross-sectional views showing fixed conditions of a glass fiber section of an optical fiber. FIG. 3(a) shows a fixed condition of a glass fiber section in a I—I section of FIG. 2, and FIG. 3(b) shows a fixed condition of a glass fiber section in a II—II section of FIG. 2. Incidentally, these figures show embodiments of optical fiber arrays each having only one optical fiber fixed to a substrate so as to simplify the description. However, an optical fiber array of the present invention employs a V-groove substrate having a plurality of V grooves, and it is possible to use a plurality of optical fibers in an optical fiber array of the present invention.

As shown in these drawings, an optical fiber array of the present invention is constituted by a V-groove substrate 5, a lid substrate 4, and an optical fiber 1. The V-groove substrate 5 has: a V-groove forming portion 9 having a V groove 6 for housing an uncovered glass fiber section 2 formed at an end portion of an optical fiber therein, and a lower covered section housing portion 7 for housing a covered section of the optical fiber therein, the lower covered section housing portion being formed to be deeper than the V-groove forming portion 9. The lid substrate 4 has: a glass fiber protective portion 10 covering an upper surface of the uncovered glass fiber section 2 of the optical fiber housed in the V-groove forming portion 9 and the V groove 6, and an upper covered section housing portion 8 for housing a covered section 3 of the optical fiber 1 therein, the upper covered section housing portion being formed to be deeper than said glass fiber protective portion 10, and disposed on the V-groove substrate.

An optical fiber array of the present invention is obtained as follows. The optical fiber 1 is disposed on the V-groove substrate 5 so that the uncovered glass fiber section 2 formed at an end portion of the optical fiber 1 is housed in the V groove 6 and about a half of the lower side of the covered section 3 is housed in the lower covered section housing portion 7. The lid substrate 4 is put on the optical fiber 1 so that the glass fiber protection portion 10 covers the upper surface of the uncovered glass fiber section 2 of the optical fiber housed in the V-groove forming portion 9 and the V groove 6 and the upper covered section housing portion houses about a half of the upper side of the covered section 3. In this state, a resin (not depicted) is filled in a gap among the V-groove substrate 5, the optical fiber 1, and the lid substrate 4 and cured to unitarily join them.

A structural characteristic of the present invention is that the glass fiber protective portion 10 of the lid substrate 4 has a fiber contact portion 10a which is brought into direct contact with the glass fiber section 2 of the optical fiber 1 at the end portion thereof, and for the rest a fiber non-contact portion 10b which is not brought into direct contact with the glass fiber section 2.

In such a structure, the fiber contact portion 10a plays an important role in incorporating the optical fiber 1 in the V-groove substrate 5 with good positioning precision by pressing the glass fiber section 2 of the optical fiber 1 against the V-groove 6 upon producing an optical fiber array. There is a possibility that the glass fiber section is damaged by the contact with the fiber contact portion 10a upon this process. However, the portion being prone to be damaged contacts the fiber contact portion 10a of the glass fiber portion 2 and locates at a position different from the portion, where a stress to the glass fiber section 2 is most liable to be concentrated, between the starting point $P_1$ of the lower counter-sunk and the starting point $P_2$ of the upper counter-sunk.

Therefore, even if the glass fiber section 2 is damaged at a portion in contact with the fiber contact portion 10a when the glass fiber section 2 is pressed against the V groove 6 at the fiber contact portion 10a of the lid substrate 4, stress is not concentrated in the damaged portion unlike an optical fiber array having a conventional structure, and the fiber is not easily broken from the damage.

Further, since the glass fiber section 2 is fixed in a wide range in a longitudinal direction of the optical fiber 1 by a resin (not depicted) filled in a gap between the glass fiber section and the fiber non-contact portion 10b, the stress is hardly propagated up to a damaged section in contact with the fiber contact portion 10a even if external force such as tension is applied. Therefore, the fracture of the fiber due to the damage upon production is hardly caused, and variance in fracture strength due to variance in size of damages is reduced.

Incidentally, the fiber contact portion 10a also plays a role in avoiding the pulling out of the optical fiber 1 when a tensile stress is applied to the optical fiber 1 by sandwiching the glass fiber section 2 between the fiber contact portion 10a and the V-shaped groove 6. The fiber contact portion 10a preferably has a length of 50 $\mu$m or more in a longitudinal direction of the optical fiber 1. When the length is less than 50 $\mu$m, the aforementioned effect of avoiding the pulling out is decreased.

The aforementioned embodiment has a structure that the fiber contact portion 10a is connected with the fiber non-contact portion 10b with difference in level. In such a structure, it is preferable that the fiber non-contact portion 10b and the glass fiber section 2 of the optical fiber 1 form an almost constant gap within the range from 50 $\mu$m to 300 $\mu$m. When the gap is too large, the quantity of the resin to be filled in the gap between the fiber non-contact portion 10b and the glass fiber section 2 is increased, and stress is prone to be propagated up to the portion where the glass fiber section 2 is fixed by the fiber contact portion 10a (i.e., the damaged portion of the fiber) due to elasticity of the resin, and thereby the fiber is more easily fractured at the damaged portion.

Figure 4:
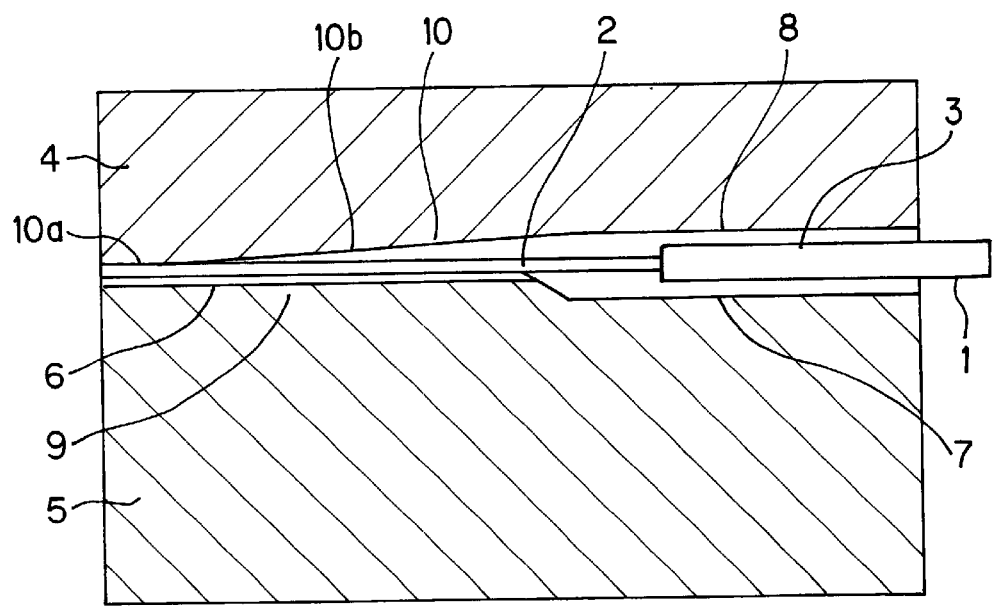
FIG. 4 is a cross-sectional view showing another embodiment of an optical fiber array of the present invention.

FIG. 4 shows an embodiment where the fiber non-contact portion 10b is tapered so that a gap between the fiber non-contact portion 10b and the glass fiber section 2 of the optical fiber 1 becomes narrower from the side of the upper covered section housing portion 8 toward the side of the fiber contact portion 10a. In this embodiment, an edge portion proceeding from the fiber contact portion 10a to the fiber non-contact portion 10b is blunted, and the glass fiber section 2 is hardly damaged in comparison with the case of a shape having difference in level as in FIG. 2.

Figure 5:
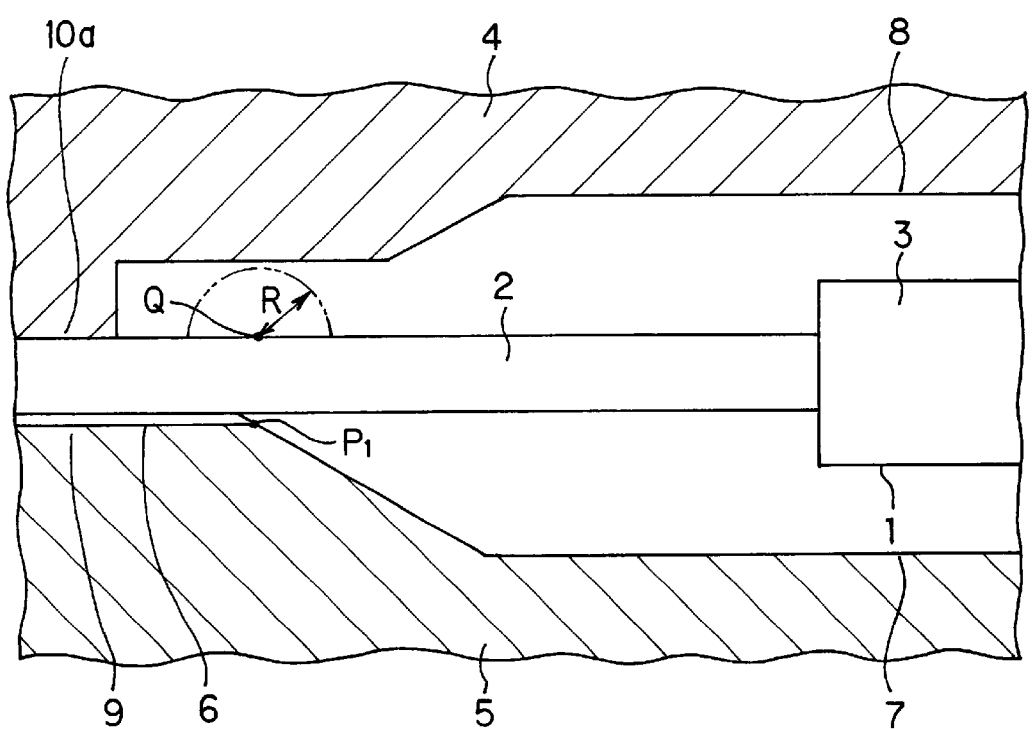
FIG. 5 is an enlarged cross-sectional view of a principal part showing a preferable mode of an optical fiber array of the present invention.

In the present invention, as shown in FIG. 5, it is preferable that no portion of the lid substrate 4 is present within a range of 50 $\mu$m from a top point Q of the glass fiber section 2 of the optical fiber 1 present above in the perpendicular direction (direction of a thickness of the substrates) of a starting point $P_1$ of a lower counter-sunk proceeding from the V-groove forming portion 9 to the lower covered section housing portion 7 in a vertical cross-section along the longitudinal direction of the optical fiber 1. By setting the fiber contact portion 10a or the like of the lid substrate 4 outside this range, the position of the damaged portion can be moderately made different from that of the portion where stress concentrates to effectively avoid concentration of stress in the damaged portion.

In the present invention, as a material for the V-groove substrate and the lid substrate, it is preferable to use a hard material which is hardly deformed, for example, glass and silicon like a conventional optical fiber array, so as to ensure positioning precision of an optical fiber. As a resin to be filled in a gap among the V-groove substrate, the optical fiber, and the lid substrate to unitarily join them, a resin adhesive is suitably used. The kind of resin adhesive used is not particularly limited. However, since the resin adhesive is required to have hardness sufficient for holding the glass fiber section of the optical fiber in a V groove after being cured without damaging the optical fiber, it is preferable that the resin adhesive has a low thermal expansion coefficient and a hardness of about Shore D 80. An example is an epoxy adhesive.

EXAMPLE

The present invention is hereinbelow described in more detail on the basis of Examples. However, the present invention is by no means limited to these Examples.

Figure 7:
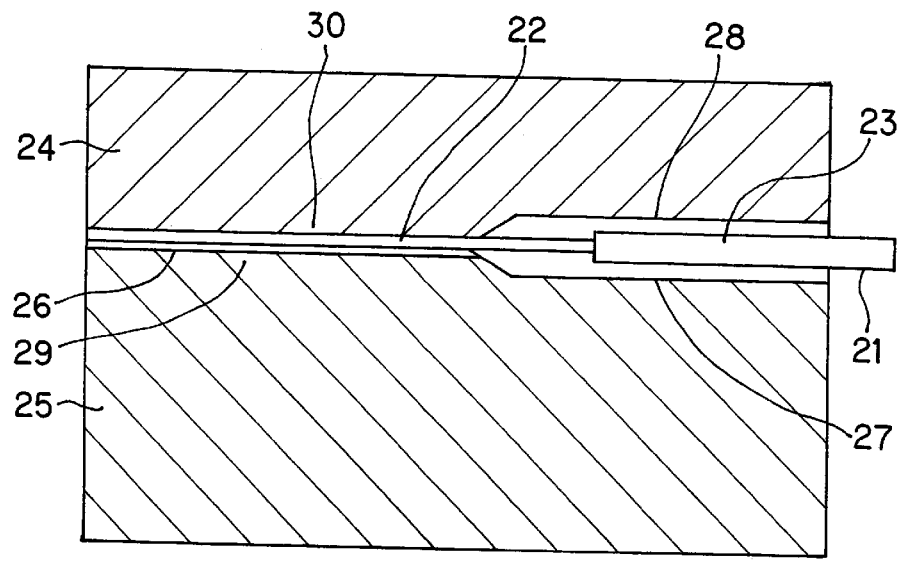
FIG. 7 is a cross-sectional view showing a conventional optical fiber array.
Figure 8:
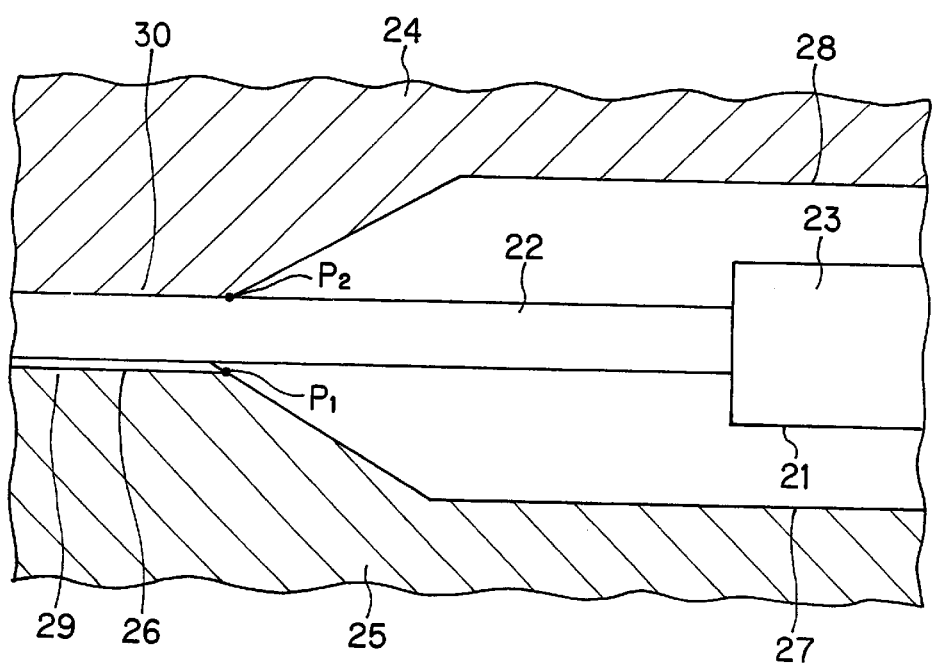
FIG. 8 is an enlarged cross-sectional view of a principal part of FIG. 7.

There were produced a plurality of optical fiber arrays each having a structure as shown in FIG. 2, which is an embodiment of the present invention, and conventional optical fiber arrays each having a structure as shown in FIG. 7. A glass material was used for the V-groove substrates and the lid substrates of both types of optical fiber arrays. Both types had the same external dimensions. A degenerated epoxy resin was used for the resin to unitarily join an optical fiber, a V-groove substrate, and a lid substrate. In the optical fiber array having a structure shown in FIG. 2 (the present invention), the length L of the fiber contact portion in the longitudinal direction of the optical fiber was made to be 0.5 mm, and the gap C between the glass fiber section and the fiber non-contact portion was set to be 50 $\mu$m.

Figure 6:
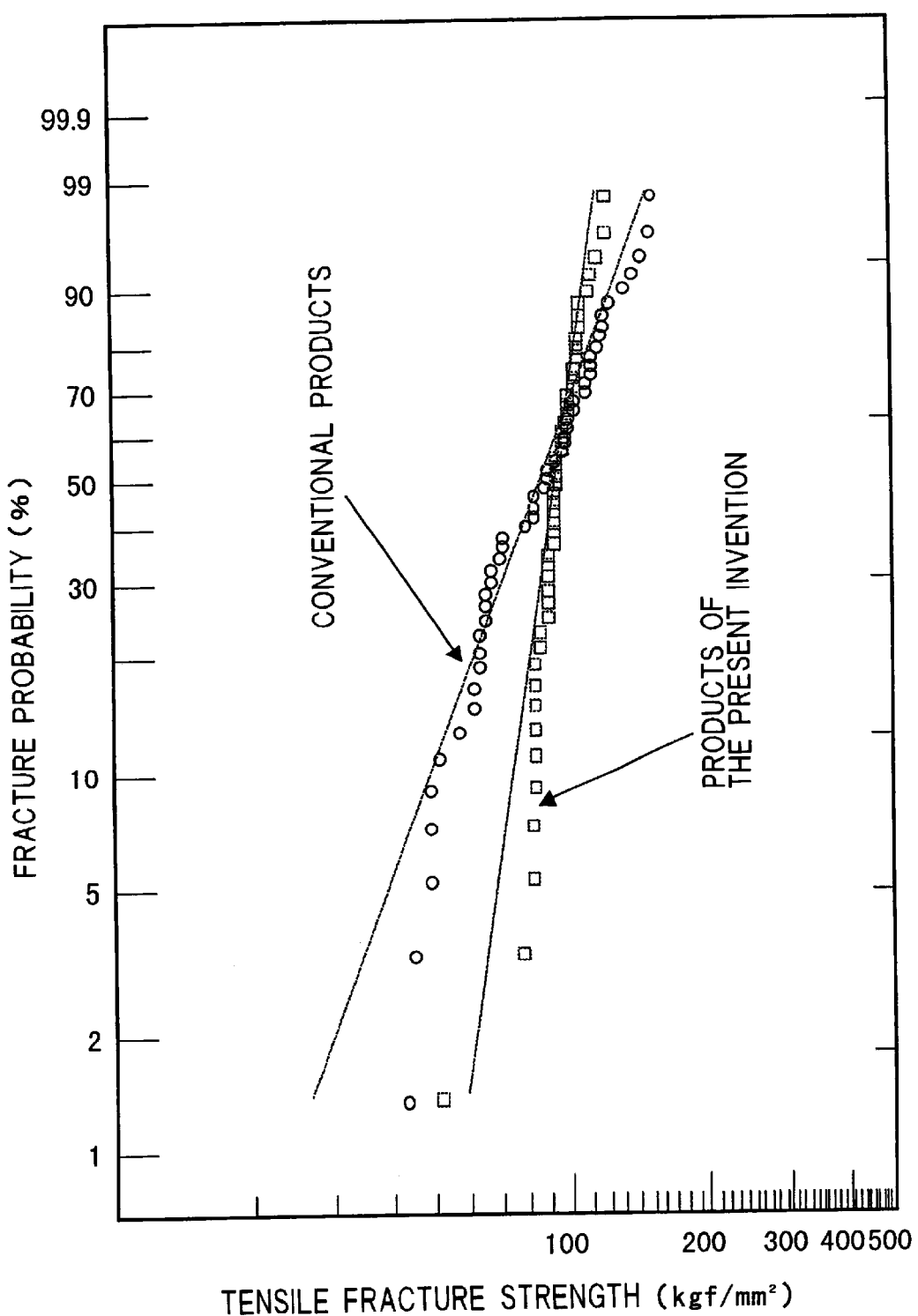
FIG. 6 is a Weibull plot drawn up on the basis of the results of the tensile test in the Example.

These fiber arrays were subjected to a tensile test in which tensile stress was applied to an optical fiber under the condition that the substrates were fixed and the tensile strength (tensile fracture strength) was measured when the optical fiber was fractured (cut off). On the basis of the results of this test, a Weibull plot with the ordinate showing the fracture probability and the abscissa showing the tensile fracture strength was prepared and is shown in FIG. 6. From this figure, it is understood that, as compared with conventional products, a smaller number of the products of the present invention were as easily fractured by a low tensile stress and the variance in strength.

As described above, in an optical fiber array of the present invention, an optical fiber is not easily broken since a stress is not concentrated in the damaged portion even if the optical fiber is damaged at a portion in contact with a lid substrate when an optical fiber array is produced. In addition, optical fiber arrays of the present invention have little variance in the fracture strength of the fibers, and the quality of the products is stabilized.

What is claimed is:

1. An optical fiber array comprising:
   a V-groove substrate having: a V-groove forming portion having a V groove for housing an uncovered glass fiber section formed at an end portion of an optical fiber therein, and a lower covered section housing portion for housing a covered section of the optical fiber therein, the lower covered section housing portion being formed to be deeper than said V-groove forming portion,
   an optical fiber disposed so that the uncovered glass fiber section is housed in the V groove and the covered section is housed in the lower covered section housing portion,
   a lid substrate having: a glass fiber protective portion covering an upper surface of the uncovered core glass fiber section of the optical fiber housed in the V-groove forming portion and the V groove, and an upper covered section housing portion for housing a covered section of the optical fiber therein, the upper covered section housing portion being formed to be deeper than said glass fiber protective portion, and disposed on the V-groove substrate, and
   a resin filled in gaps among the V-groove substrate, the optical fiber, and the lid substrate and cured to give a unitary optical fiber array,
   wherein the glass fiber protective portion has: a fiber contact portion formed at the end portion of the glass fiber protective portion so as to bring the fiber contact portion into direct contact with the glass fiber section of the optical fiber, and for the rest a fiber non-contact portion which is not brought into direct contact with the glass fiber section of the optical fiber.

2. An optical fiber array according to claim 1, wherein said fiber contact portion has a length of 50 $\mu$m or more in a longitudinal direction of the optical fiber.

3. An optical fiber array according to claim 1, wherein said fiber contact portion is connected with the fiber non-contact portion with difference in level.

4. An optical fiber array according to claim 3, wherein said fiber non-contact portion and the glass fiber section of the optical fiber form an almost constant gap within the range from 50 $\mu$m to 300 $\mu$m.

5. An optical fiber array according to claim 1, wherein said fiber non-contact portion is tapered so that a gap between the fiber non-contact portion and the glass fiber section of the optical fiber becomes narrower from the side of the upper covered section housing portion toward the side of the fiber contact portion.

6. An optical fiber array according to claim 1, wherein no portion of the lid substrate is present within a range of 50 $\mu$m from a top point of the glass fiber section of the optical fiber present above in the perpendicular direction (direction of a thickness of the substrates) of a starting point of a lower counter-sunk proceeding from the V-groove forming portion to the lower covered section housing portion in a vertical cross-section along the longitudinal direction of the optical fiber.

* * * * *